United States Patent [19]
Bodenheimer

[11] Patent Number: 5,181,541
[45] Date of Patent: Jan. 26, 1993

[54] MULTI-TANK FUEL STORAGE SYSTEM FOR REFRIGERATED FREIGHT CONTAINER ELECTRIC GENERATORE

[75] Inventor: Bert A. Bodenheimer, Stamford, Conn.

[73] Assignee: B.A. Bodenheimer & Co., Inc., Stamford, Conn.

[21] Appl. No.: 807,795

[22] Filed: Dec. 13, 1991

Related U.S. Application Data

[63] Continuation of Ser. No. 475,805, Feb. 6, 1990, abandoned.

[51] Int. Cl.$^5$ .............................................. A01G 25/09
[52] U.S. Cl. ..................................... 137/899; 137/571; 137/572; 123/510
[58] Field of Search ............... 137/571, 572, 899, 565; 123/510, 511, 514; 248/637, 645; 220/1.5

[56] References Cited

U.S. PATENT DOCUMENTS

| | | | |
|---|---|---|---|
| 1,424,486 | 8/1922 | Kinzie | 123/510 |
| 3,101,771 | 8/1963 | McCuen | 137/571 |
| 3,677,284 | 7/1972 | Mendez | 137/572 |
| 4,732,360 | 3/1988 | Bodenheimer | 248/637 |
| 4,930,537 | 6/1990 | Farmer | 137/571 |

*Primary Examiner*—A. Michael Chambers
*Attorney, Agent, or Firm*—David P. Gordon

[57] ABSTRACT

A multi-tank fuel storage system is provided for a generator unit which can be mounted to a container in a clip-on fashion and/or mouned to a chassis supporting the container in an underslung fashion. The preferred multi-tank fuel storage system includes: a first fuel storage tank built into the generator unit housing; a separate auxiliary fuel storage tank; a feed line and pump coupling the tanks for transferring fuel from the auxiliary tank to the first fuel storage tank; an overflow line coupling the tanks for transferring overflow from the first fuel storage tank to the auxiliary fuel storage tank; and conduits for coupling the first fuel storage tank to the engine of the generator unit. Quick disconnect couplings are placed in the feed line and the overflow line so that the auxiliary tank can be uncoupled from the system. The first fuel storage tank preferably includes a horizontal section integral with the generator unit housing, and a vertical section, with the top of the vertical section located above the top of the auxiliary fuel storage tank so as to permit the overflow line to work through use of gravity only. Preferably, the multi-tank fuel storage system is used in conjunction with a generator unit housing frame which includes apparatus for mounting the generator unit housing in either a clip-on fashion to the container or in an underslung fashion to a chassis supporting the container.

24 Claims, 6 Drawing Sheets

MULTI-TANK FUEL STORAGE SYSTEM FOR REFRIGERATED FREIGHT CONTAINER ELECTRIC GENERATORE

This is a continuation now abandoned of co-pending application Ser. No. 07/475,805 filed on Feb. 6, 1990.

BACKGROUND

The present invention relates to multi-tank fuel storage systems for transportable electric generators. More particularly, the invention relates to flexible capacity, multi-tank fuel storage systems for refrigerated freight containers. The multi-tank fuel storage system is usable with containers that are transported by truck in either the underslung or the clip-on mode, as well as containers which are transported by rail or ship.

Refrigerated freight containers which are transportable by truck, rail, and, ship are well known in the art. Electric generator units which attach either to a chassis transporting such a container, or which attach directly to the refrigerated freight containers to provide the necessary power are also known in the art. Indeed, standards for such refrigerated freight containers and their attachments have been promulgated by ANSI and ISO and specify loads, fittings, and clearances to be used with containers utilized in international commerce.

Those skilled in the art will recognize that different requirements present themselves for each mode of transportation of the containers. For example, in the railroad mode, a higher fore and aft load requirement is necessary than on ship due to coupling forces which occur during reclassification of railcars. In the ship mode, to permit stacking and/or proper loading it is preferable that the generator unit housings not extend above the top plane of the refrigerated container. In the truck mode, if the generator housing is mounted to the front of the container ("clip-on"), it is necessary to provide swing clearance for the tractor pulling the chassis mounted container. If the generator housing is mounted to the chassis ("underslung"), a sufficient ground clearance is necessary to prevent damage from road hazards. Because of these different requirements, the industry initially provided some refrigerated containers which were particularly arranged to be equipped with underslung generators, and other containers which were particularly arranged to be equipped with clip-on generators. However, this lack of uniformity forced the operators to maintain two incompatible sets of generators which led to unacceptable expenses and complications, in order to overcome these difficulties, a combination unit which could be used in either the underslung or clip-on mode was provided by the inventor hereof. Details of that combination unit are provided in U.S. Pat. No. 4,732,360, which is hereby incorporated by reference herein.

Another difficulty which has been encountered by the art concerns the fuel storage capacity of the generator unit system. Two alternatives are generally available. A first system stores fuel in a fuel tank integral to the generator unit housing; typically in a storage area formed by the base of the housing. In order to have a large fuel supply, the base must be designed with a large storage area which may not be necessary for short trips and which is only occasionally fully used for long distance trips. Also, as the storage area is increased, compatibility with different modes of transportation, and different container arrangements decreases. In particular, because the storage area is increased by substantially increasing the depth of the base (the width being substantially preset due to other constraints), the unit cannot be used in an underslung arrangement because not enough road clearance is provided. Also, even in the clip-on mode, refrigerator unit control doors may be undesirably blocked.

A second system used in the art stores fuel in a separate tank (see e.g. U.S. Pat. No. 4,732,360, previously incorporated herein) which is coupled to the generator via appropriate hoses. While this system is a little more flexible than the integral tank storage system, as different sized tanks may be switched in and out as desired, the system still suffers from the fact that if the separate tank is carried in the underslung mode, the capacity is limited due to road clearance problems. Moreover, the switching of tanks and the use of large capacity tanks is undesirable from an operation standpoint because additional equipment is required, and the maintaining of a range of tank sizes is undesirable from a financial standpoint.

SUMMARY OF THE INVENTION

It is therefore an object of the invention to provide a fuel supply system for an electric generator unit of a container which provides storage capacity flexibility.

It is a further object of the invention to provide a fuel supply system for an electric generator unit which permits large amounts of fuel to be stored regardless of the mode in which the generator unit is carried.

It is another object of the invention to provide a flexible capacity multi-tank fuel storage system for a refrigerated freight container generator unit where the housing for the generator unit may be mounted to the container in a clip-on fashion and to a chassis in an underslung arrangement.

It is a further object of the invention to provide a multitank fuel storage system which meets all the requirements of truck, rail, and ship transport, and which permits storage of one hundred twenty gallons or more of usable fuel in either clip-on or underslung mode.

In accord with the objects of the invention, a multi-tank fuel storage system is provided for a generator unit which can be mounted to a container in a clip-on fashion and/or mounted to a chassis supporting the container in an underslung fashion. The multi-tank fuel storage system generally comprises:

a) a first fuel storage tank built into the generator unit housing, the generator unit housing including means for mounting the generator unit housing in either a clip-on fashion to the container and/or in an underslung fashion to a chassis supporting the container;

b) a separate second fuel storage tank which is nonintegral with said generator unit housing;

c) first fluid conduit means coupling the first fuel storage tank and the separate second fuel storage tank; and d) second fluid conduit means coupling one of the first and second fuel storage tanks and the engine of the generator unit. In the preferred arrangement, the first fuel storage tank is integral with the generator unit housing (the term "built in" intended to be understood in the broad sense to include both integral tanks and tanks which may be placed in a preset structural location within the generator unit housing). Also, in the preferred arrangement, the second fluid conduit means couples the first fuel storage tank and the engine. Further, the first fluid conduit means comprises an overflow line for transferring fuel overflow of said first fuel storage tank to the second fuel storage tank which acts as an auxiliary, and a feed line for transferring fuel from the second fuel storage tank to the first fuel storage tank when needed. The feed line includes a fuel transfer pump for effecting the fuel transfer, while the feed an overflow lines each include a quick disconnect coupling so that the first fuel storage tank can be used without the auxiliary tank when desired.

According to another aspect of the invention, the first fuel tank is primarily situated in the horizontal base of the housing frame, although a vertical section of the first fuel tank is also preferably provided. The provision of the vertical section permits the overflow line from the first fuel tank to the auxiliary tank to utilize gravity, as the top of the vertical section of the first fuel tank will always be above the auxiliary tank regardless of whether the tanks are utilized in the clip-on or underslung mode. Also, fuel intake ports (i.e. fill tubes) are located on the vertical section of the first fuel tank as well as on the auxiliary tank. This gives the operator a choice in filling up the tanks, as it may be easier to gain access to one tank in the clip-on mode, and the other tank in the underslung mode.

Another aspect of the invention combines the multi-tank arrangement with aspects of U.S. Pat. No. 4,732,360, and thereby provides an extremely flexible system which may be used in both a clip-on and underslung mode, as well as with truck or rail, and which can be used with or without added fuel storage capacity.

A better understanding of the invention, and additional advantages and objects of the invention will become apparent to those skilled in the art upon reference to the detailed description and the accompanying drawings.

DETAILED DESCRIPTION OF THE PREFERRED EMBODIMENT

Figure 1:
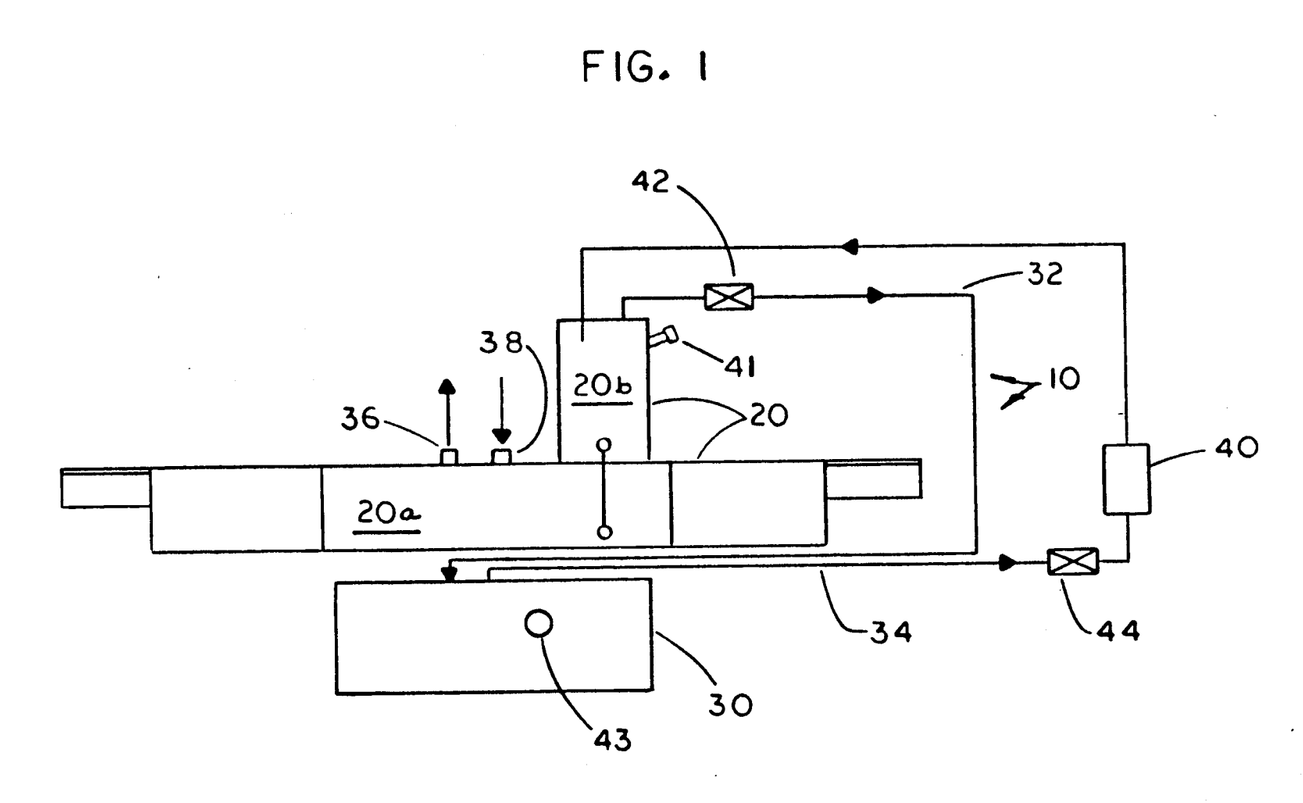
FIG. 1 is a partial block diagram, partial schematic of the multi-tank fuel storage system of the invention.

The preferred multi-tank fuel storage system 10 of the invention is seen generally in FIG. 1. The system 10 includes a first fuel storage tank 20 which is integral with the generator unit housing 60 (see FIG. 2a), and a separate second fuel storage tank 30 (i.e. auxiliary tank) which is nonintegral with (i.e. detachable from) the generator unit housing 60. The first fuel storage tank 20 preferably includes a large horizontal section 20a which essentially comprises the base of the generator unit housing 60, as well as a smaller vertical section 20b which is in fluid communication with the horizontal section 20a and which extends vertically therefrom. Extending from near the top of the vertical section 20b of the first fuel tank to the auxiliary tank 30 is an overflow conduit 32. The overflow conduit 32 preferably starts from a height above the top of the auxiliary tank 30 so that the system can work by gravity. Extending from near the bottom of auxiliary tank 30, up through the tank 30 and out its top, and to the first storage tank 20 is a feed conduit 34. Fuel is pumped from the auxiliary tank 30 to the first storage tank 20 by a pump 40 which may be running continuously or intermittently as desired. Quick disconnect couplings 42 and 44 are provided in conduits 32 and 34 so that the auxiliary tank 30 may be removed from the system when desired.

In order to feed fuel to the generator unit engine, engine pick-up and return fuel lines 36 and 38 are provided. The pick-up line 36 preferably extends from near the bottom of the horizontal section 20a of the first fuel tank, up through tank 20a and out its top, while the return line 38 preferably returns to the top of horizontal section 20a. Standard pumps and valves (not shown) for the generator unit engine are utilized.

Fuel fill tubes 41 and 43 are provided on the vertical section 20b of the first tank, and on the auxiliary tank 30. The provision of two fill tubes gives the operator a choice in filling up the tanks, as it may be easier to gain access to one tank in the clip-on mode, and the other tank in the underslung mode.

In operation, an operator fills up the fuel tanks 20 and 30 by putting the fuel nozzle into fill tube 41 or 43. If fill tube 41 is used, the fuel goes from vertical tank 20b into horizontal tank 20a until horizontal tank 20a is full. Then vertical tank 20b is filled. As the capacity of vertical tank 20b is almost reached, fuel spills into the overflow conduit 32 and is sent to the auxiliary tank 30. Auxiliary tank 30 is then filled to capacity, at which time the filling procedure is terminated. On the other hand, if fuel tube 43 is used, as auxiliary tank 30 is filled, the fuel is pumped out of tank 30 by pump 40 via the feed conduit 34 up to the vertical tank 20b and into horizontal tank 20a. This flow continues until horizontal tank 20a is full and vertical tank 20b is almost full. Then, either the pump 40 is turned off so that the auxiliary tank 30 can be filled, or the fuel exits the vertical tank 20b via the overflow line to fill the auxiliary tank 30.

With full tanks, the generator unit engine takes fuel from the first tank 20 via the engine pick-up line 36 and returns extra fuel to the first tank 20 via the engine return line 38. The fuel for running the engine is always obtained from the first tank 20. As fuel is used, the level of the vertical tank 20b drops. By using a sensor (not shown), the level of the vertical tank 20b can be sensed, and as fuel is used, it is replenished from the auxiliary tank 30 by pump 40. Alternatively, pump 40 runs continuously or intermittently at preset intervals. If too much fuel is pumped into the vertical tank 20b, the excess fuel returns to the auxiliary tank via the overflow conduit. Regardless of how the replenishment occurs, pump 40 takes the fuel from the auxiliary tank and pumps it via the feed line 34 to the vertical tank 20b. When all of the fuel in auxiliary tank 30 has been pumped out, the fuel is not replenished. Rather, as the engine continues to use fuel, the level first in the vertical tank 20b and then in the horizontal tank 20a decreases until all the fuel is used, or until the operator refills the multi-tank system.

Because the engine pick-up line is from the first tank 20, it will be appreciated that the engine can be run from the first tank 20 without help of an auxiliary tank 30. To disconnect the auxiliary tank 30 from the system, the overflow and feed conduits are severed at the quick disconnect couplings 36 and 38. Because couplings 36 and 38 are closed, pump 40 will not operate, and fuel will not overflow from the system. Rather, the engine will utilize the fuel in the vertical and horizontal tanks much in the same way as it would use fuel from integral tanks of the prior art.

Considerable advantages are gained from the multi-tank fuel storage system shown in FIG. 1. First and foremost, tremendous storage capacity (upwards of one hundred and twenty gallons) is provided by the system such that a generator unit may be kept running several days without a required fill-up. Second, the system permits the tremendous storage capacity to be utilized in either the clip-on or the underslung mode. Third, because the auxiliary tank can be removed from the system, hauls requiring smaller capacity can be efficiently handled without using an entirely different housing. Fourth, by providing housings of different storage capacities along with auxiliary tanks of different storage capacities, an operator can "mix and match" as desired to obtain an arrangement most favorable to the situation. In fact, in order to outfit a fleet of refrigerated containers with desired fuel capacities, fewer auxiliary tanks than generator unit housings will be required (unless all containers are used in long-haul situations). As a result, overall costs are reduced.

Figure 2A:
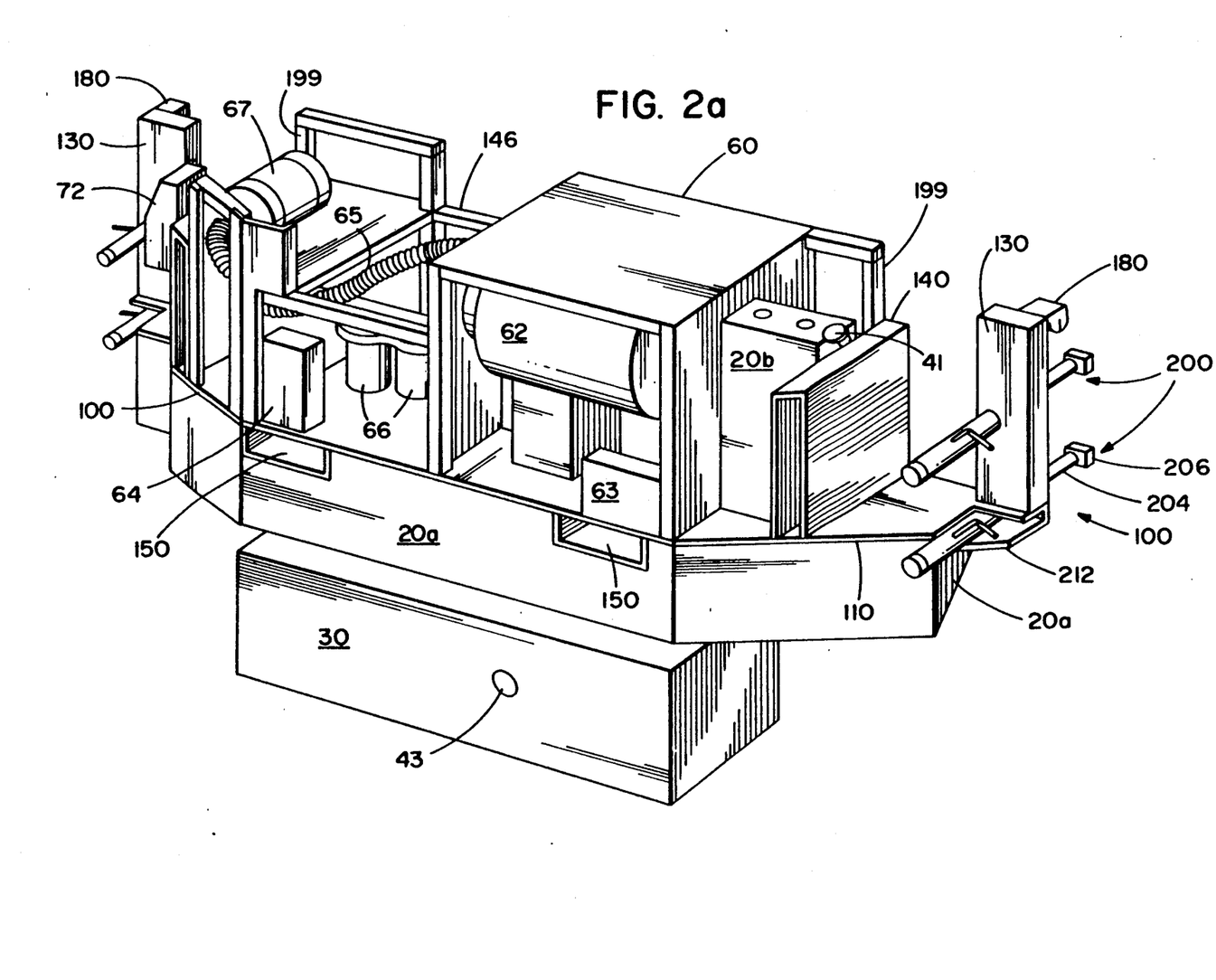
FIGS. 2a and 2b are perspective and top view diagrams showing fuel storage system elements in and attached to a preferred housing.
Figure 5:
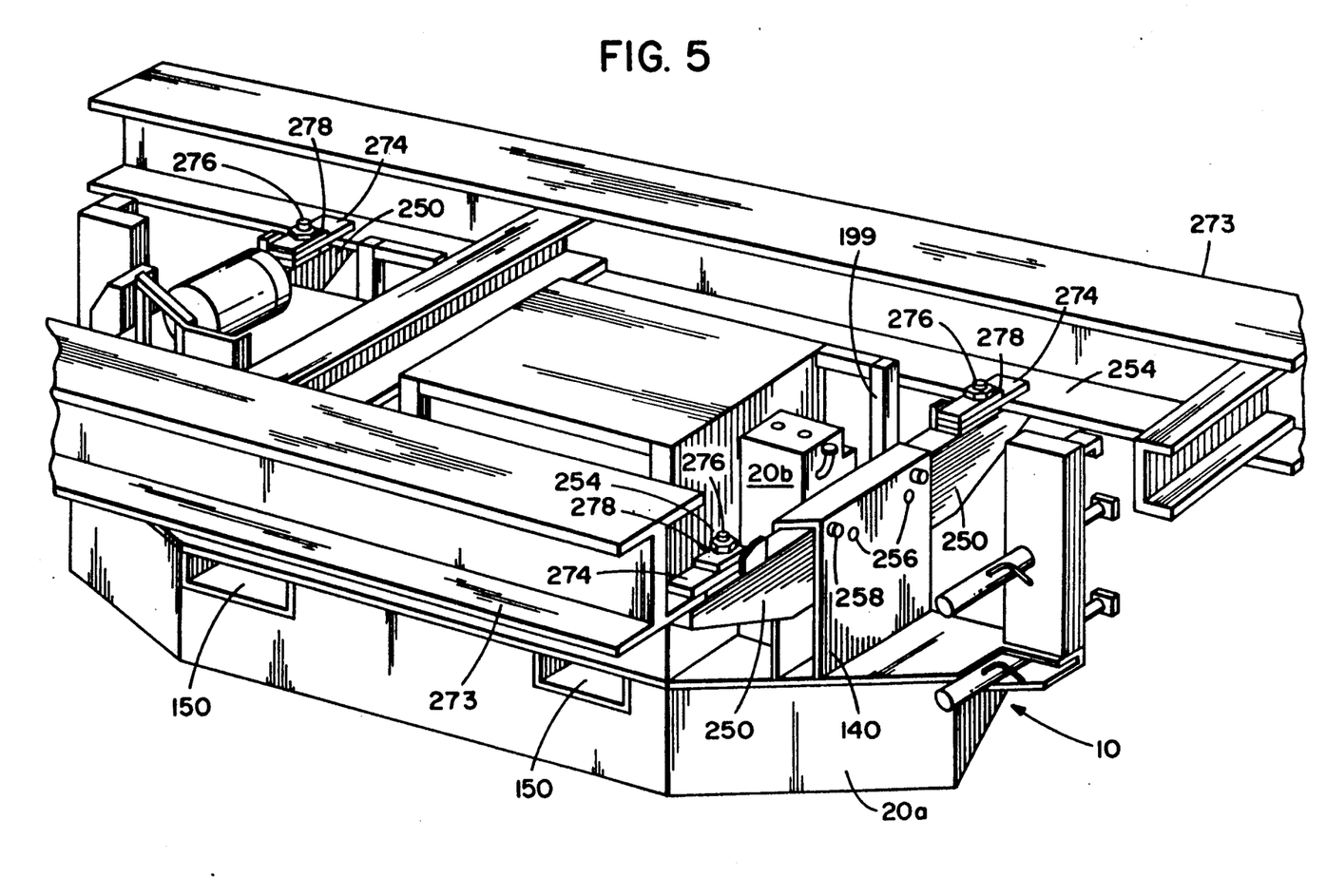
FIG. 5 is a perspective of the multi-tank fuel storage system in conjunction with a rigid frame structure arranged in the underslung mode.

The multi-tank fuel storage system 10 is preferably utilized in conjunction with a generator unit 60 which can be mounted in either a clip-on or underslung fashion to a container 115 (see FIG. 2b) or container chassis (see FIG. 5). As seen in FIG. 2a, the generator unit 60 basically includes an engine and alternator 62, a gauge section 63, a control section 64, fuel filters 66, a hose 65 for connecting an air breather 67 to the engine 62, a power receptacle 72, other standard equipment (not shown) and a housing frame 100 which will be described in more detail hereinafter. It will be appreciated that the various elements of the generator unit other than the housing frame 100 work with the fuel system 10 and with each other in a manner which is well known in the art to permit the generator to generate the electricity required to permit the refrigeration of the container. The only specific requirement that the generator unit elements must meet for purposes of the invention beyond the ANSI or ISO standards is that they must fit into the provided housing which is restricted in shape and volume due to considerations discussed in the Background section herein. For example, it will be seen that the base 110 and integral tank 20a of the generator unit housing 100 takes almost a bow-like shape to meet the necessary swing clearance requirements of the tractor cab. Likewise, it will be seen that the height of the unit is restricted so that the housing of the generator unit 60 does not extend beyond the top plane of the refrigerated freight container when used in the clip-on mode, and therefore permits a crane spreader to lift the refrigerated freight container with the generator unit attached thereto for stacking in the ship mode. Further, it will be seen that the unit is shaped so that it does not extend downward too far and interfere with access to doors on the refrigeration unit. By restricting the height of the unit, the necessary ground clearance is also provided when the generator unit is attached to the container chassis in the underslung mode. Further, for the underslung mode, the unit must be provided with clear areas so as not to interfere with any chassis crossmembers or other structures.

Figure 2B:
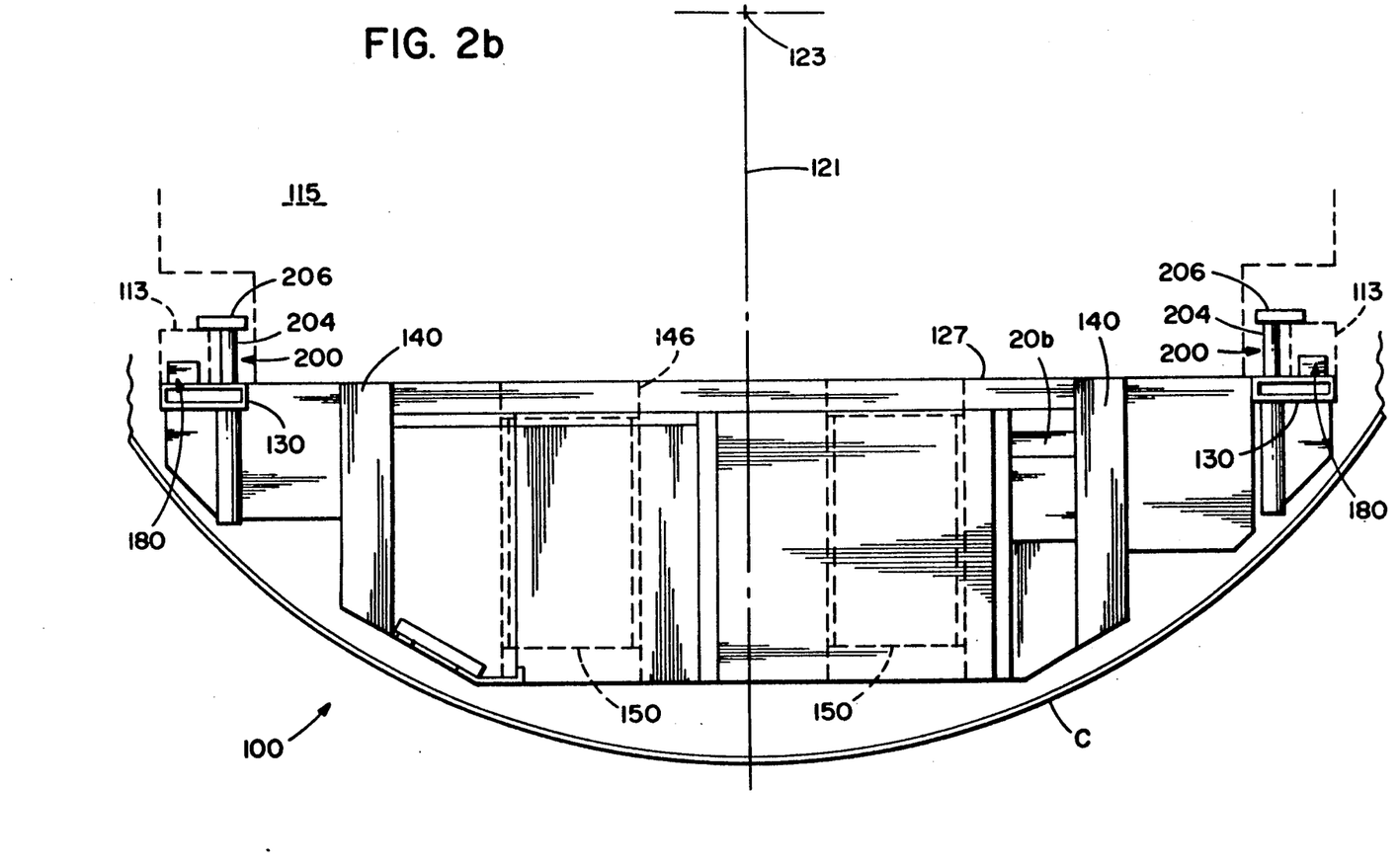
Figure 4:
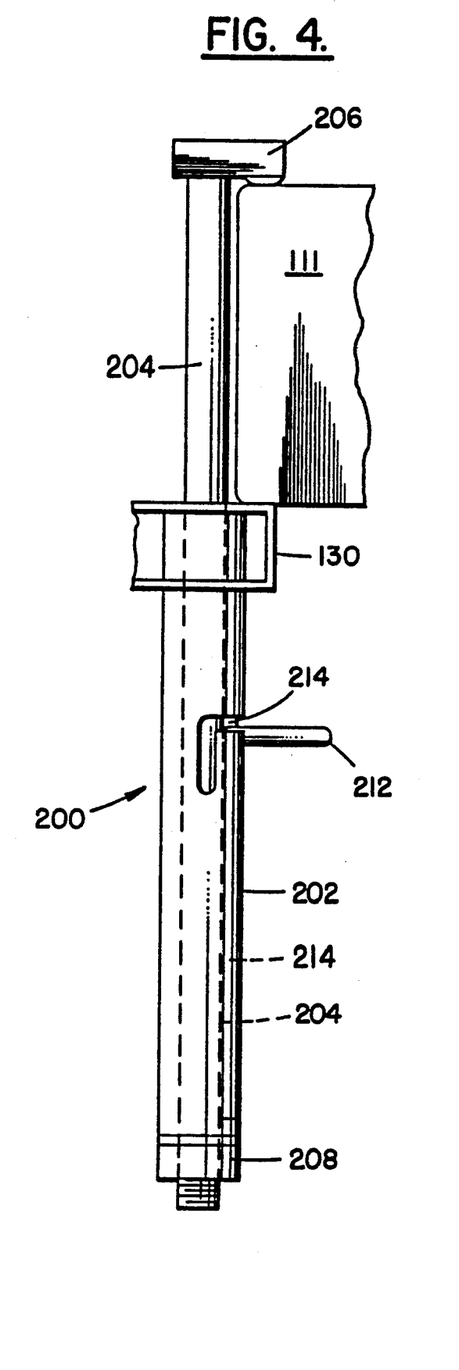
FIG. 4 is a diagram of the horizontal force clamp of the housing shown in FIGS. 2a and 2b.

Turning to FIGS. 2a and 2b, additional details of the frame structure of the housing 100 are seen. (It should be noted at the outset that unnumbered members seen in FIGS. 2a and 2b are primarily provided to support house generator unit components, or to support cosmetic panels, and are not considered part of the frame 100.) The frame structure has as its base a horizontal member 110 which is preferably a carbon steel section of at least one-eighth inch thickness. Horizontal member 110 serves as the top member of integral tank 20a. The length of substantially rigid horizontal member 110 (approximately ninety-four inches) is substantially equal to the horizontal length of the front face of a container so as to permit fitting means 180 which are at either end of housing frame 100 to fit into the top corner castings 113 (which sit atop the corner posts 111 which are seen in FIG. 4) of the container 115. The horizontal member 110 is also shaped, as seen in FIG. 2b, so that the housing 100 will not extend beyond a sixty-two inch radius 121 having at its center a point 123 which is set back thirty-six inches from the front end 127 of the container 115 (and forming a partial circumference C). Thus, at its center area, the horizontal member 110 is provided with a depth of a little over twenty-two inches. However, at about twenty-two inches away from the center line, the horizontal member tapers off at an angle of about twenty-five degrees from the horizontal. Thus, the overall shape of the horizontal member 110 appears as a bow. If desired, the tapering off can be accomplished by having ninety degree turns in the periphery of the horizontal member 110 in a step-like fashion with the overall appearance still being relatively bow-like.

The frame structure of the housing further includes at least two vertical posts 130 integrally connected to the horizontal member 110, one at each end of said horizontal member. The posts 130 need not be rectangular in cross section, but should provide enough rigidity to help support the structure. In the embodiment of FIGS. 2a and 2b, the posts 130 are approximately twenty-five inches in height. With such a unit height, even with a six inch fuel tank 20a, when the unit is in the underslung mode and hung from the bottom of the chassis I-beams, an adequate ground clearance of approximately ten inches for road transport will be provided. The vertical posts 130 serve not only to provide structural integrity in the vertical fashion to the unit 60, but also to provide supports for both the fitting means 180 (described hereinafter with reference to FIG. 3) which engage the corner castings 113 of the container 115, and the horizontal force clamps 200 (described hereinafter with reference to FIG. 4) which must clamp around the corner posts 111 of the container 115.

Figures 6A, 6B:
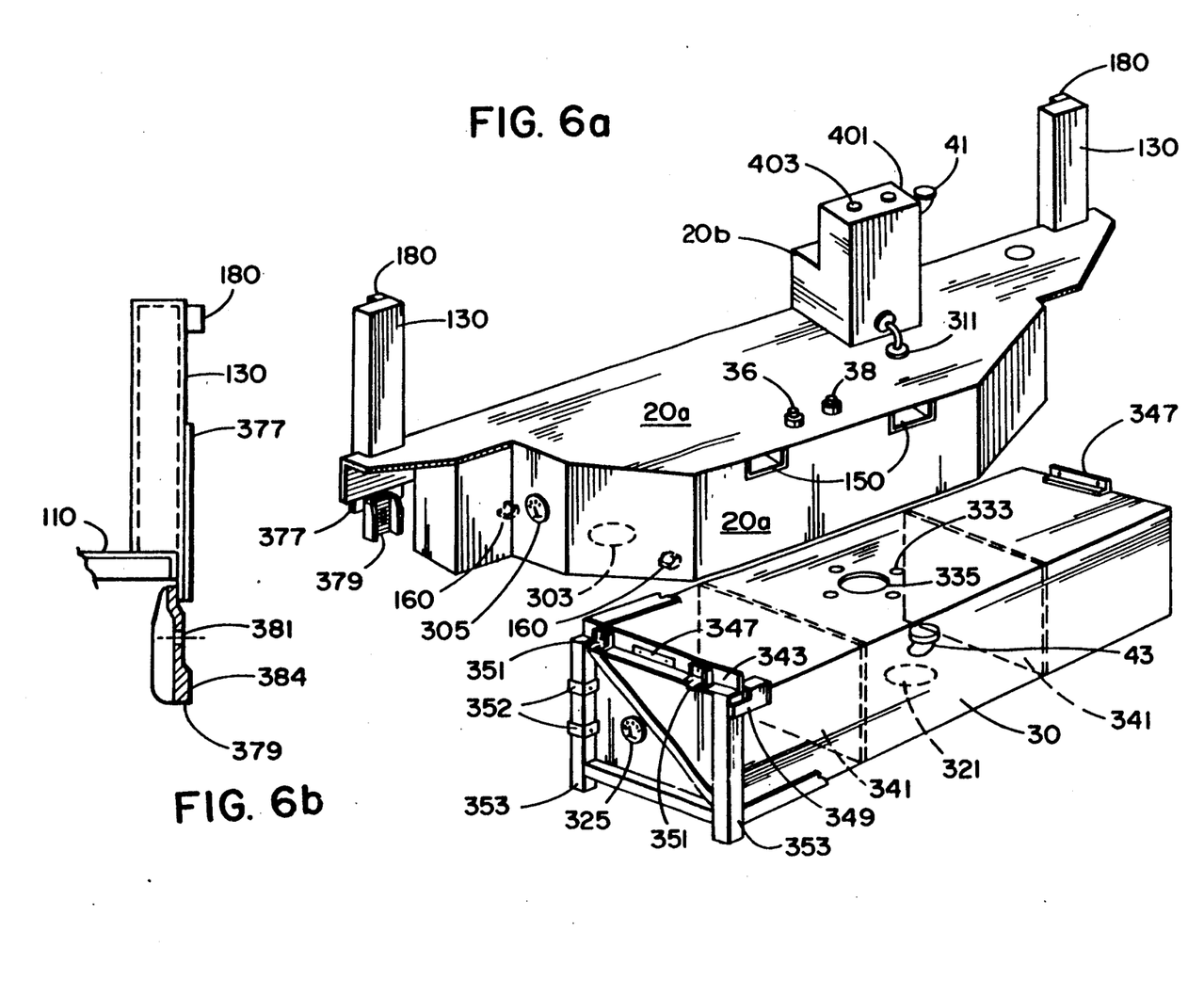
FIG. 6a is a partial schematic diagram showing details of certain fuel storage elements of the multi-tank system of the invention in conjunction with a modified housing.
FIG. 6b is a diagram of the clamp plate of the modified housing.

The vertical posts 130 may also serve to help support arm housing frames 140 which house and support the foldable attachment arms 250 (described hereinafter with reference to FIG. 6), and which may also be considered part of the frame. The vertical arm housing frames 140 are integrally connected to the horizontal member 110 and are stabilized by member 146.

According to the preferred embodiment of the invention, the housing frame 100 also includes tubular members 150 which are arranged to accept fork-lift tines, and around which tank 20a extends. The tubular members 150 are substantially rectangular in cross section and are integrally connected to the horizontal member 110 such that the lengths of horizontal member 110 and the tubular members 150 are perpendicular to each other.

Finally, with regard to the frame of the housing 100, fuel tank supports 160 (see FIG. 6a) are preferably provided to permit the auxiliary tank 30 to be attached externally to the generator unit 60 in the clip-on mode, and tubes 165 with holes (not shown) for bolts or screws are provided to permit the auxiliary tank to be attached to the rear of the generator unit frame 100 in the underslung mode. Additional detail regarding the support structures for the auxiliary tank 30 is provided hereinafter with reference to FIGS. 6a and 6b.

Figure 3:
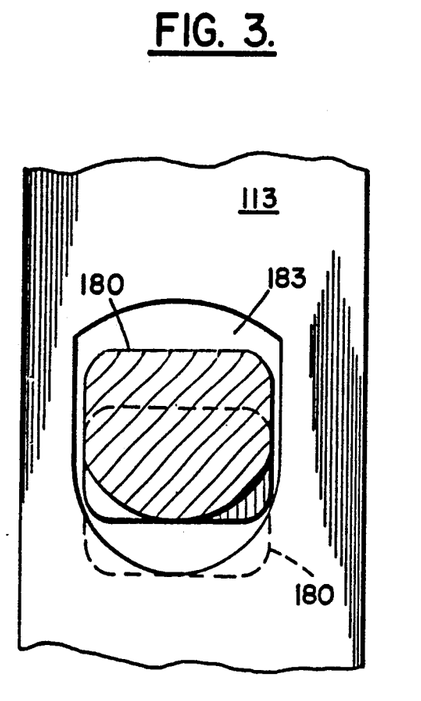
FIG. 3 is a diagram of the fittings which engage the front top openings of the corner post castings of the refrigerated unit.

While the frame of the housing 100 provides the structural integrity to support the generator unit 60, it is the foldable attachment arms 250 which permit the generator unit 60 to be mounted to the chassis in an underslung fashion, and the fittings 180 and the horizontal force clamps 200 which permit the generator unit 60 to be mounted on the container in a clip-on fashion. As seen in FIGS. 2a, 2b and FIG. 3, the fittings 180 extend outwardly towards the container 115 from near the top of the vertical posts 130 so as to engage the front openings 183 of the corner castings 113 of the container unit 115. Additional detail regarding fittings 180 may be had with reference to U.S. Pat. No. 4,732,360, previously incorporated herein.

Fittings 180 remove the vertical forces to which the housing 100 is subject. In one embodiment of the invention, horizontal force clamps 200 are provided to remove horizontal forces. As seen in FIGS. 2a, 2b and 4, the horizontal force clamps are connected to the vertical posts 130 of the housing and are arranged to engage the corner posts 111 of the container 115. The clamps 200 are able to engage the corner posts 111 because gaps in the front surface of the container 115 exist behind and beside the corner posts 111 of the unit 115. The gap behind the corner post 111 is relatively the larger of the two gaps, and ladder rungs may be placed therein. In engaging the corner posts 111 with the clamps 200, care must be had to avoid the ladder rungs. Preferably, four horizontal force clamps 200 are provided for removing horizontal forces, with two clamps attached to each vertical housing post 130 near the bottom and middle of each post.

Details of the horizontal force clamp 200 are seen in FIG. 4. The clamp 200 preferably comprises an outer member 202, an inner sliding member 204 which is externally threaded over part of its length and which includes a clamping hand 206 for engaging the corner post 111, a threaded nut 208 for locking the inner sliding member 204 with respect to the outer member 202, and means 212 and 214 for turning and locking the inner sliding member 204 ninety degrees with respect to the outer member 202. Details regarding the functioning of clamps 200 may be had with reference to U.S. Pat. No. #4,732,360, previously incorporated herein.

While the fittings 180 and horizontal force clamps 200 provide a manner for permitting the generator unit 60 to be clipped onto the container 115, two sets of foldable attachment arms 250 which are housed in and supported by the vertical arm housing frames 140 are provided as part of the housing 100 to permit the generator unit 60 to be attached to the container chassis in an underslung manner as seen in FIG. 5. In order for the foldable attachment arms 250 to function in the preferred manner, accompanying structure such as I-beam clamps 254, fixed pins 256, and removable support pins 258 are preferably included. The I-beam clamps 254 include top clamping surfaces 274 having oblong cut-outs, bolts 276 which are arranged to extend through the cut-out portion of the top clamping surfaces and through holes in the bottom clamping surfaces, and nuts 278 for tightening the clamp around the I-beams 273.

When the generator unit 10 is used in the clip-on mode, the foldable attachment arms 250 are kept in their retracted mode inside vertical arm housing 140 because if they were extended, they would extend past the permitted sixty-two inch radius, and extend beyond the front plane of the container 115. Thus, the arms may be spring loaded in a retracted position, or kept in a retracted position through the use of bolts or the like, if desired. Or, since gravity forces would naturally tend to keep the arms retracted, no such particular means are mandatory.

In the underslung mode, where the attachment arms 250 must be extended. Thus, arms 250 are arranged to rotate around fixed pins 256 and thereby swing outward. The arms may then be secured in their extended position through the use of the removable support pin 258 which are placed through a prepared hole in vertical arm housing 140 and through corresponding holes in arms 250 such that the arm 250 and housing 140 are fastened one to the other. Typically, the attachment arms 250 must be manually raised into their extended position. If desired, however the arms 250 may be spring loaded to help the arms extend. Additional details of the foldable attachment arms 250 of the preferred embodiment are had with reference to U.S. Pat. No. 4,732,360, previously incorporated herein.

Turning to FIGS. 6a and 6b, additional details of the fuel tank system of the invention as well as a second embodiment of the support structure for mounting in a clip-on fashion are seen. In FIG. 6a, where like parts to FIG. 2a are represented with like numerals, a six inch deep horizontal tank 20a is provided and holds approximately thirty-five gallons of fuel. Horizontal tank 20a includes a drain 303 for cleaning purposes, gauge 305 for purposes of detecting how full the tank is, and forklift pockets 150 for lifting the unit. In communication with tank 20a via hole 311 is the vertical tank 20b which holds approximately seven gallons of fuel. Vertical tank 20b includes filling tube 41 as well as openings 401 and 403 for the overflow and feed conduits 32 and 34. Also shown in FIG. 6a is the auxiliary tank 30, with filling tube 43, drain 32, gauge 325, gasket opening 333 and screw holes 335, baffles 341, and tank frame 343 (only part of which is shown). The gasket opening and screw holes are provided for a plate (not shown) which would incorporate as a single unit a gasket and the overflow and feed lines. The plate could be fastened by screws which would extend through the plate and into holes 335. The baffles 341 are provided to prevent sloshing of the fuel.

As shown in FIG. 6a, the auxiliary tank is a rectangular tank with approximate dimensions of 52.25 inches length, 17.38 inches width, and 21.62 inches height, and can hold approximately eighty-four gallons. Thus, the total capacity of the six inch deep horizontal tank 20a, the vertical tank 20b, and the auxiliary tank 30 is approximately one hundred twenty-six gallons, of which approximately one hundred twenty gallons are usable (five percent being "unusable" according to standards).

With the six inch horizontal tank 20a, and with an auxiliary tank having a height of approximately 21.6 inches, ground clearance in the underslung mode for both the tank and the generator housing with a full load and taking into account spring deflection and tire deflection is approximately 10.15 inches. This exceeds the 9.25 inch requirement of AAR Specification 931 by almost one inch. Of course, by extending the depths of tanks 20a and 30 by the almost one inch, additional fuel storage capacity of about ten gallons can be gained if desired.

While it is also possible to increase the fuel capacity of the auxiliary tank 30 by increasing its length, the length of 52.25 inches is chosen so that the auxiliary tank will not interfere in the clip-on mode with control doors found on the front face of some refrigerated containers or with the foldable attachment arms 250 which are extended for attachment to the I-beams of a chassis in the underslung mode. Of course, by sacrificing access, and by providing a cut-out for arms 250, auxiliary tank 30 can be horizontally extended to hold additional fuel without increasing its depth.

In FIG. 6a, it is seen that auxiliary tank 30 has two sets of brackets 347 and 349 which are used to connect the tank via screw or bolts (not shown) to the auxiliary tank frame 343. In turn, welded to the auxiliary tank frame 343 are brackets 351 which are used to connect via screws or bolts (not shown) to the brackets 160 of the generator unit frame so that the auxiliary tank can be arranged in the clip-on fashion. Also, the auxiliary tank frame 343 includes holes 351 on at least two of its vertical posts 353 which are arranged to cooperate with similar holes (not shown) on posts 199 of the generator frame 100 (see FIG. 2a). In this manner, in the underslung mode, the auxiliary tank can be lined up with and bolted to the generator unit frame 100.

As seen in FIG. 6a, the support structure for the clip-on mode differs from that seen in FIG. 2a. In particular, while posts 130 are provided with fittings 180, they are not provided with horizontal force clamps 200. Rather, as seen in FIG. 6b, the posts 130 are provided with extensions 377 which extend downward past the horizontal member 110, and the housing is further provided with clamp plates 379 having holes 381. The clamp plates 379 are arranged with a thicker section 384 which contacts the container surface and a thinner section 386 which fits over the extension 377. Hole 381 is aligned with a similar hole provided in the container, and a bolt (not shown) is extended therethrough to clamp the clamp plate 379 and hence post 130 (via extension 377) in place. If desired, a hole (not shown) on the post 130 may be provided for permitting the bolt to hold the clamp plate 379 when clamp plate 379 is not utilized (i.e. when the generator unit is not in the clip-on mode).

There has been described and illustrated herein a multi-tank fuel storage system for refrigerated freight container electric generators. While particular embodiments of the invention have been described, it is not intended that the invention be limited thereby, as it is intended that the invention be broad in scope and that the specifications be read likewise. Thus, while the preferred system utilizes an integral tank and an auxiliary tank, it will be appreciated that instead of making one tank integral to the generator housing, the tank could be built into the housing without making it integral thereto. In particular, the "built in" tank could be a removable tank which is fit into a prescribed section of the generator housing. One example of such a system would be to make a frame of the same shape of tank 20a and to provide a tank which could be slid therein. The tank would have attached hoses with quick connect couplings for the generator engine. If a nonintegral built in vertical tank 20b were also provided, a quick connect coupling between the horizontal and vertical tanks 20a and 20b could be provided. Regardless of the exact arrangement, it will be appreciated that for purposes of the invention, the term "built in" is to be understood broadly as providing a structural location for a fuel tank and not necessarily as requiring that the fuel tank be integral to the generator housing.

It should also be apparent to those skilled in the art that while the preferred system of the invention utilizes a housing substantially as disclosed in U.S. Pat. No. 4,732,360, that other housings could be utilized. In particular, the housing need not be one which accommodates both the underslung and clip-on modes, as the fuel storage system invention can be utilized with a housing which is limited to one mode or the other. Further, the provision, location, and size of the horizontal and vertical tanks in conjunction with the housing need not be exactly as disclosed. For example, a "vertical" tank section is not required; particularly where the unit is a clip-on unit. In fact, a vertical tank is not required even in the underslung mode provided a second pump and a sensor are utilized to sense fuel overflow and to pump the overflow to the auxiliary tank. Likewise, by rearranging other generator components, it may be possible to create a tank which is primarily vertical as opposed to horizontal, although for weight balancing purposes such an arrangement is not particularly desired. Indeed, tanks in a wide range of sizes can be provided, particularly for the clip-on mode where ground clearance is not an issue.

It will further be appreciated that while a rectangular auxiliary fuel tank of particular size has been described, auxiliary tanks of any shape and size could be utilized provided that proper ground clearance in the case of the underslung arrangement, and proper cab clearance, in the case of the clip-on arrangement are provided. In fact, it may well be desirable to provide different different size auxiliary tanks for use in different situations. Thus, with different sized housing tanks, and different sized auxiliary tanks, an operator can mix and match as desired. Therefore, it will be apparent to those skilled in the art that other changes and modifications may be made to the invention as described in the specification without departing from the spirit and scope of the invention as so claimed.

I claim:

1. A multi-tank fuel storage system for a refrigerated freight container generator unit which has a generator unit housing frame which can be mounted to at least one of, a container in a clip-on fashion where said generator unit housing frame extends adjacently forward said container but is spaced behind a truck cab pulling a chassis which supports said container to permit swing clearance of said truck cab, or said chassis supporting the container in an underslung fashion where said generator unit housing frame is extends under said chassis but above the ground over which said chassis extends in a manner providing sufficient ground clearance, the multi-tank fuel storage system comprising:

a) said generator unit housing frame, including a first fuel storage tank built into said generator unit housing frame;

b) a separate second fuel storage tank which is nonintegral with said generator unit housing frame, and which, when said housing frame can be mounted to said container in a clip-on fashion, also extends adjacently forward said container but is spaced behind said truck cab pulling said chassis which supports said container to permit swing clearance of said truck cab, and when said housing frame can be mounted to said chassis in an underslung fashion, also extends under said chassis but above the ground over which said chassis extends in a manner providing sufficient ground clearance;

c) first fluid conduit means coupling said first fuel storage tank and said separate second fuel storage tank; and d) second fluid conduit means coupling one of said first and second fuel storage tanks and an engine of said generator unit.

2. A multi-tank fuel storage system according to claim 1, further comprising:

e) a fuel pump, wherein said first fluid conduit means is a feed line, and said fuel pump is coupled in said feed line for automatically pumping fuel when needed from said second fuel storage tank through said feed line to said first fuel storage tank.

3. A multi-tank fuel storage system according to claim 2, further comprising:

f) an overflow line coupling said first and second fuel storage tanks automatically for funnelling excess fuel from said first fuel storage tank to said second fuel storage tank.

4. A multi-tank fuel storage system according to claim 2, further comprising:

f) a first fuel filling tube on said first fuel storage tank; and g) a second fuel tube on said second fuel storage tank.

5. A multi-tank fuel storage system according to claim 3, further comprising:

g) a first quick connect coupling coupled in said overflow line; and h) a second quick connect coupling coupled in said feed line.

6. A multi-tank fuel storage system according to claim 5, further comprising:

i) an engine return fuel line coupling an engine of said generator unit and one of said first and second storage tanks, wherein said second fluid conduit means is an engine pick-up fuel line.

7. A multi-tank fuel storage system according to claim 6, wherein:

said engine return fuel line and said engine pick-up fuel line couple said engine of said generator unit and said first fuel storage tank.

8. A multi-tank fuel storage system according to claim 7 in conjunction with said generator unit housing frame, wherein said generator unit housing frame is limited in size to permit proper clearance of a truck cab if said generator unit housing frame is to be mounted to said container in a clip-on fashion, or to permit proper clearance with the ground if said generator unit housing frame is to be mounted to said container in an underslung fashion.

9. A multi-tank fuel storage system according to claim 5, further comprising:

i) a first fuel filling tube on said first fuel storage tank; and j) a second fuel filling tube on said second fuel storage tank.

10. A multi-tank fuel storage system according to claim 5, wherein:

said generator unit housing frame is substantially rigid, and includes a mounting means supported by said substantially rigid frame for mounting said housing on said container so as to substantially remove both horizontal and vertical forces from said housing, and retractable means supported by said substantially rigid frame for mounting said housing on said chassis which supports said container, said retractable means being extended when said housing is mounted on said chassis in an underslung arrangement, and said retractable means being retracted when said housing is mounted on said container in a clip-on arrangement.

11. A multi-tank fuel storage system according to claim 1, wherein:

said generator unit housing frame has a base, and said first fuel storage tank is integral with said base.

12. A multi-tank fuel storage system according to claim 11, wherein:

said base is substantially horizontal, and said first fuel storage tank further includes a substantially vertical portion located in said housing in a location other than said base.

13. A multi-tank fuel storage system according to claim 12, further comprising:

e) a first fuel filling tube on said substantially vertical portion of said first fuel storage tank; and f) a second fuel filling tube on said second fuel storage tank.

14. A multi-tank fuel storage system according to claim 12, further comprising:

e) a fuel pump, wherein said first fluid conduit means is a feed line, and said fuel pump is coupled in said feed line for automatically pumping fuel when needed from said second fuel storage tank through said feed line to said first fuel storage tank, and f) an overflow line coupling said first and second fuel storage tanks for automatically funnelling excess fuel from said first fuel storage tank to said second fuel storage tank, wherein said overflow line is coupled to said substantially vertical portion of said first fuel storage tank at a location above the top of said second fuel storage tank.

15. A multi-tank fuel storage system according to claim 14, further comprising:

g) a first quick connect coupling coupled in said overflow line;

h) a second quick connect coupling coupled in said feed line; and i) an engine return fuel line coupling an engine of said generator unit and said first fuel storage tank, wherein said second fluid conduit means is an engine pick-up fuel line coupling said engine and said first fuel storage tank.

16. A multi-tank fuel storage system according to claim 14, wherein;

said first and second fuel storage tanks together hold at least one hundred twenty gallons of fuel, said substantially horizontal section of said fuel storage tank is less than seven inches deep, and said second fuel storage tank is less than twenty-three inches deep.

17. A multi-tank fuel storage system according to claim 16, wherein:

said second fuel storage tank is less than fifty-five inches wide.

18. A multi-tank fuel storage system according to claim 17 in conjunction with said generator unit housing frame, wherein said generator unit housing frame is limited in size to permit proper clearance of a truck cab if said generator unit housing frame is to be mounted to said container in a clip-on fashion, or to permit proper clearance with the ground if said generator unit housing frame is to be mounted to said container in an underslung fashion.

19. A multi-tank fuel storage system according to claim 12, wherein:

said generator unit housing frame is substantially rigid, and includes a mounting means supported by said substantially rigid frame for mounting said housing on said container so as to substantially remove both horizontal and vertical forces from said housing, retractable means supported by said substantially rigid frame for mounting said housing on said chassis which supports said container, said retractable means being extended when said housing is mounted on said chassis in an underslung arrangement, and said retractable means being retracted when said housing is mounted on said container in a clip-on arrangement;

fuel tank supports for said second fuel storage tank, wherein said base in which said first fuel storage tank is located further includes rectangular, substantially tubular member for accepting fork-lift tines.

20. A multi-tank fuel storage system according to claim 19, wherein:

said first and second fuel storage tanks together hold at least one hundred twenty gallons of fuel, said substantially horizontal section of said fuel storage tank is less than seven inches deep, and said second fuel storage tank is less than twenty-three inches deep, and less than fifty-five inches wide.

21. A multi-tank fuel storage system according to claim 12 in conjunction with said generator unit housing frame, wherein said generator unit housing frame is limited in size to permit proper clearance of a truck cab if said generator unit housing frame is to be mounted to said container in a clip-on fashion, or to permit proper clearance with the ground if said generator unit housing frame is to be mounted to said container in an underslung fashion.

22. A multi-tank fuel storage system according to claim 1, wherein:

said first and second fuel storage tanks together hold at least one hundred twenty gallons of fuel.

23. A multi-tank fuel storage system according to claim 1, wherein:

said generator unit housing frame is substantially rigid, and includes a mounting means supported by said substantially rigid frame for mounting said housing on said container so as to substantially remove both horizontal and vertical forces from said housing, retractable means supported by said substantially rigid frame for mounting said housing on said chassis which supports said container, said retractable means being extended when said housing is mounted on said chassis in an underslung arrangement, and said retractable means being retracted when said housing is mounted on said container in a clip-on arrangement, and fuel tank supports for said second fuel storage tank, wherein said base in which said first fuel storage tank is located further includes rectangular, substantially tubular member for accepting fork-lift tines.

24. A multi-tank fuel storage system according to claim 1 in conjunction with said generator unit housing frame, wherein said generator unit housing frame is limited in size to permit proper clearance of a truck cab if said generator unit housing frame is to be mounted to said container in a clip-on fashion, or to permit proper clearance with the ground if said generator unit housing frame is to be mounted to said container in an underslung fashion.

* * * * *